(12) United States Patent
Bischofberger

(10) Patent No.: US 8,701,618 B2
(45) Date of Patent: Apr. 22, 2014

(54) PISTON/PISTON RING ARRANGEMENT

(75) Inventor: Ulrich Bischofberger, Esslingen (DE)

(73) Assignee: MAHLE International GmbH, Stuttgart (DE)

( * ) Notice: Subject to any disclaimer, the term of this patent is extended or adjusted under 35 U.S.C. 154(b) by 245 days.

(21) Appl. No.: 12/971,379

(22) Filed: Dec. 17, 2010

(65) Prior Publication Data

US 2011/0155092 A1   Jun. 30, 2011

(30) Foreign Application Priority Data

Dec. 19, 2009   (DE) .......................... 10 2009 059 657

(51) Int. Cl.
*F02F 3/00* (2006.01)
*F01B 31/00* (2006.01)
*F01B 29/00* (2006.01)

(52) U.S. Cl.
USPC ................. 123/193.6; 92/168; 92/126; 92/88

(58) Field of Classification Search
USPC .......................................... 123/193.6; 92/126
See application file for complete search history.

(56) References Cited

U.S. PATENT DOCUMENTS

| | | | | | |
|---|---|---|---|---|---|
| 2,093,332 A | * | 9/1937 | Marien | .......................... | 277/485 |
| 2,117,986 A | * | 5/1938 | Robertson | ..................... | 277/446 |
| 2,235,475 A | * | 3/1941 | Bruegger | ..................... | 277/449 |
| 4,358,121 A | * | 11/1982 | Sand | ............................ | 277/445 |
| 4,966,068 A | * | 10/1990 | Ficht et al. | ..................... | 92/193 |
| 5,072,653 A | * | 12/1991 | Parsons | .......................... | 92/126 |

FOREIGN PATENT DOCUMENTS

| | | |
|---|---|---|
| DE | 102 34 528 | 2/2004 |
| EP | 0 059 233 | 9/1982 |
| FR | 1 178 629 | 5/1959 |

* cited by examiner

*Primary Examiner* — Noah Kamen
*Assistant Examiner* — Syed O Hasan
(74) *Attorney, Agent, or Firm* — Collard & Roe, P.C.

(57) ABSTRACT

A piston/piston ring arrangement for an internal combustion engine has a piston that is provided with at least one piston ring accommodated in a ring groove, which ring has a ring gap. A spring element is disposed between the groove root of the ring groove and the piston ring, which element fills the ring gap of the piston ring. A modular unit is composed of such a piston/piston ring arrangement and a cylinder or a cylinder sleeve of an internal combustion engine.

8 Claims, 2 Drawing Sheets

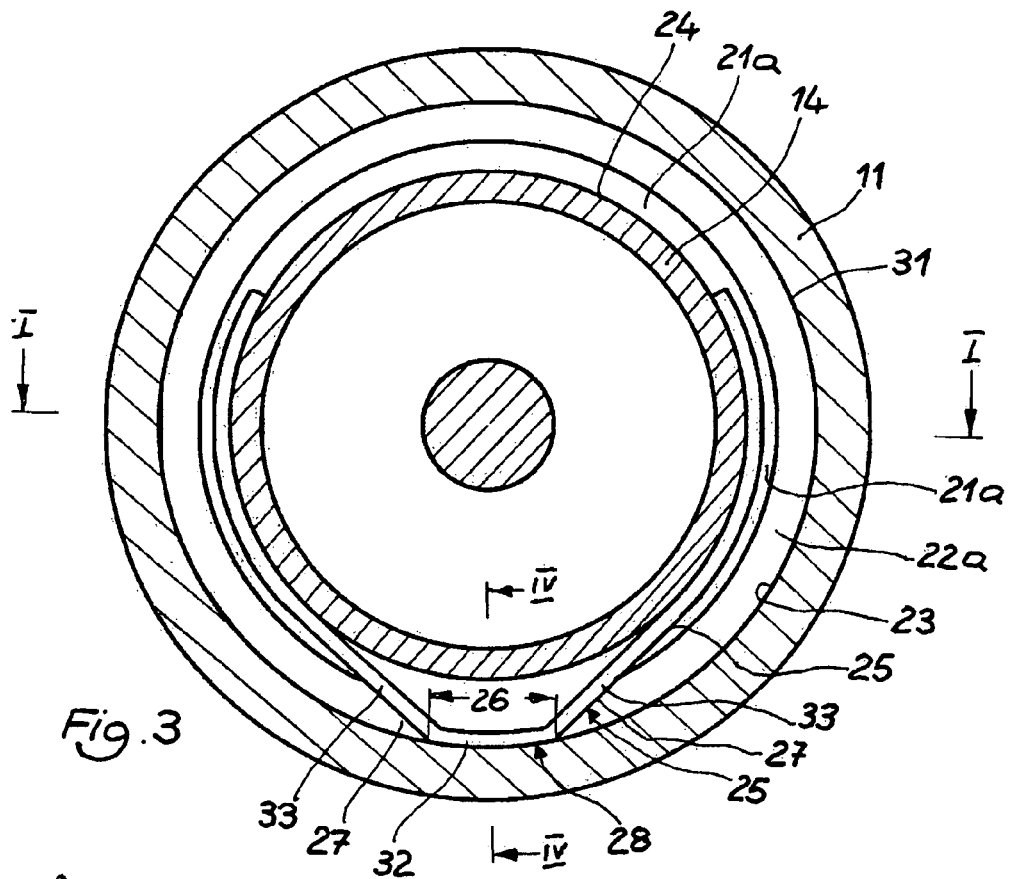
Fig. 3
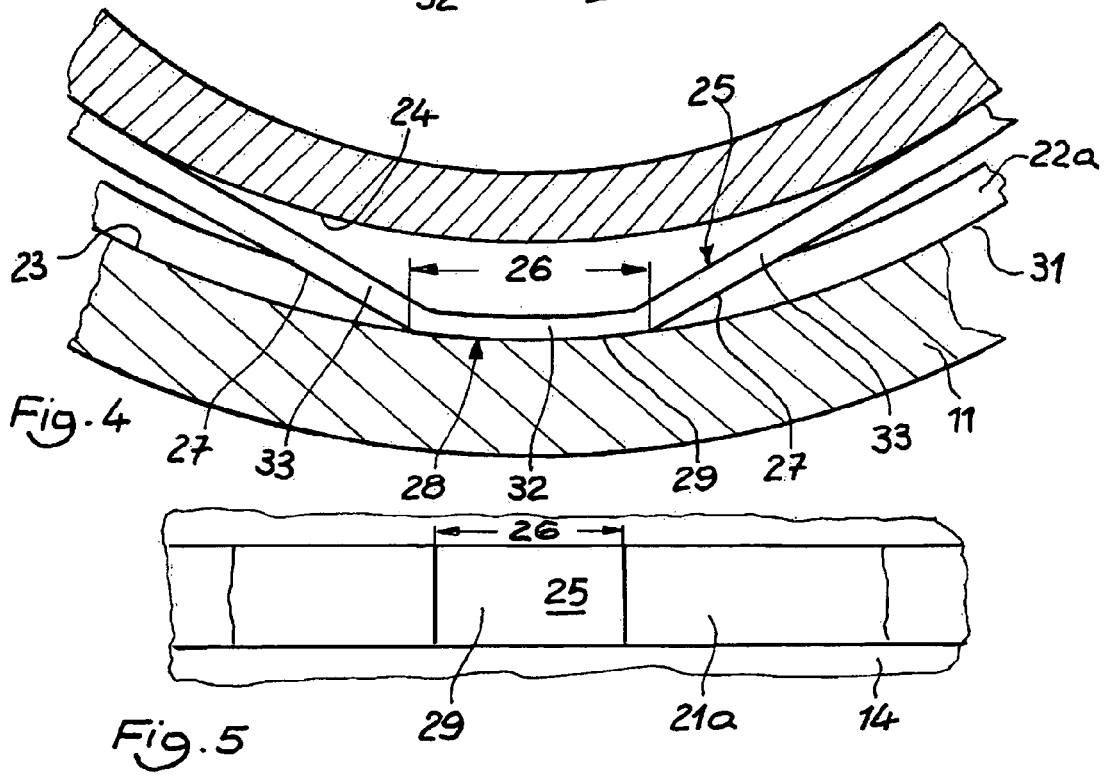
Fig. 4
Fig. 5

PISTON/PISTON RING ARRANGEMENT

BACKGROUND OF THE INVENTION

1. Field of the Invention

The present invention relates to a piston and piston ring arrangement for an internal combustion engine, having a piston that is provided with at least one piston ring accommodated in a ring groove having a ring gap. The present invention furthermore relates to a modular unit composed of a piston and piston ring arrangement and a cylinder or a cylinder sleeve of an internal combustion engine.

2. The Prior Art

These types of piston/piston ring arrangements are described in European Patent Application No. EP 0 059 233 A1, German Patent Application NO. DE 102 34 528 A1, and French Patent No. FR 1 178 629. These piston rings must seal the cylinder space in the direction of the crankcase, against the combustion gases formed during ignition of the fuel/air mixture in the combustion chamber, during operation. The rings are also supposed to prevent lubricant oil or oil vapors from passing into the combustion chamber.

SUMMARY OF THE INVENTION

It is an object of the present invention to provide a piston/piston ring arrangement that brings about a reliable seal between the combustion chamber and the cylinder space, in the simplest possible manner.

This object is accomplished by a spring element disposed between the groove root of the ring groove and the piston ring, which element fills the ring gap of the piston ring. The modular unit according to the invention has a spring element disposed between the groove root of the ring groove and the piston ring, which element fills the ring gap of the piston ring, in such a manner that the mantle surface of the piston ring lies closely against a working surface of the cylinder or the cylinder sleeve.

The present invention makes it possible, in a particularly simple manner, to achieve a very good seal of the cylinder space with regard to the combustion chamber, over the course of a work cycle, by achieving a uniform pressure distribution over the entire circumference of the piston ring. The piston/piston ring arrangement according to the invention therefore achieves a significant improvement as compared with the state of the art, using particularly simple means. This is accompanied by increased efficiency and a clear cost reduction.

In one embodiment, the spring element is disposed in the ring groove in a circumference region of at least 180°, so that the spring element is securely held in the ring groove. For particularly simple installation, it is practical if the spring element does not describe a full ring in the ring groove, but rather has at least one ring edge, and preferably extends over a circumference region of about 270°.

It is advantageous if the spring element and the piston ring have the same axial height, in order to achieve a particularly uniform pressure distribution. For this purpose, in particular, it is practical if the spring element is configured as a leaf spring.

In another embodiment, the spring element forms an elevation that fills the ring gap of the piston ring, since such a spring element is particularly simple to produce. It is advantageous if the outer surface of the elevation and the mantle surface of the piston ring are disposed flush to one another, so that in the modular unit according to the invention, the outer surface of the elevation lies closely against the working surface of the cylinder or the cylinder sleeve. In this way, a particularly comprehensive sealing effect is achieved.

Preferably, the elevation has converging slants connected with a crosspiece, and the piston ring has slanted surfaces corresponding to the slants, so that the piston ring and the spring element lie fully against one another and contribute to the comprehensive sealing effect.

The invention can be used for all piston types and piston materials (for example light-metal pistons, steel pistons, one-part or multi-part pistons, cast pistons, forged pistons, etc.), as well as for all piston ring shapes and piston ring materials.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 3 shows a section along the line III-III in FIG. 1;

FIG. 4 shows an enlarged partial representation of the piston/piston ring arrangement according to the invention, from FIG. 3; and FIG. 5 shows a frontal representation of the piston/piston ring arrangement according to the invention, from FIG. 3, in the direction of the arrow A in FIG. 3.

DETAILED DESCRIPTION OF THE PREFERRED EMBODIMENT

Figure 1:
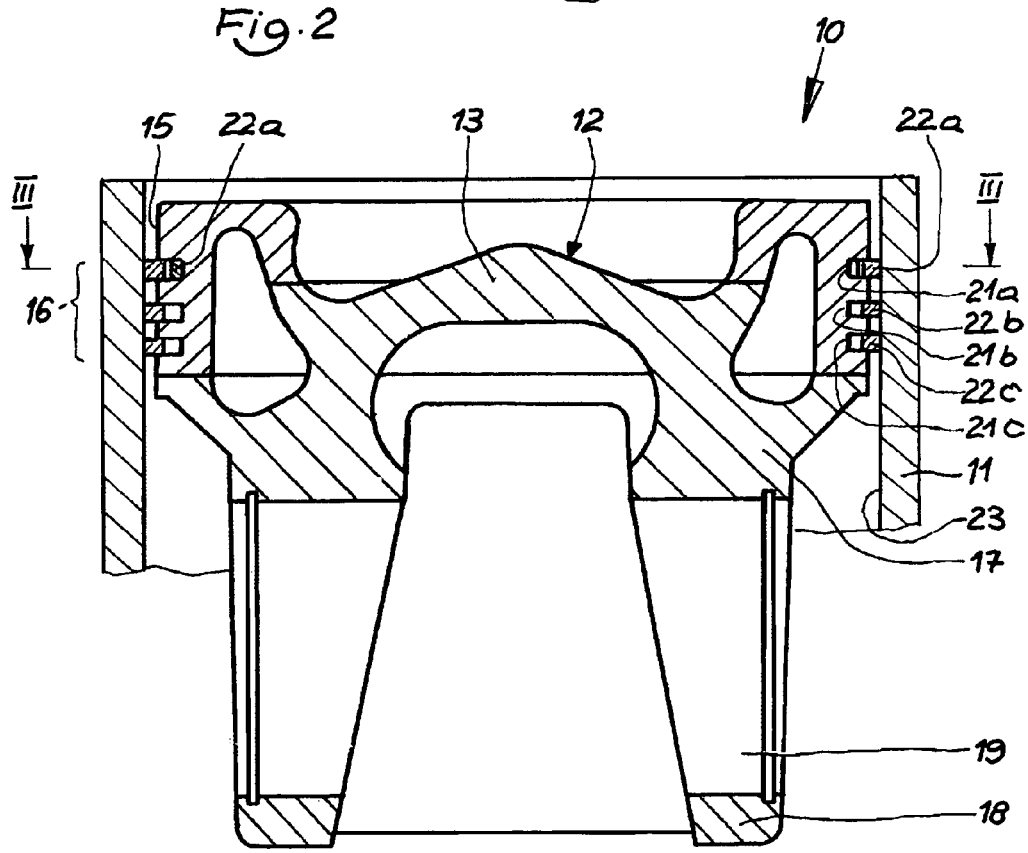
FIG. 1 shows an overall representation of a modular unit according to the invention, having a piston/piston ring arrangement according to the invention.

Referring now in detail to the drawings, FIG. 1 shows an exemplary embodiment of a modular unit 10 according to the invention, composed of a cylinder sleeve 11 and a piston/piston ring arrangement 12. In place of the cylinder sleeve 11, a cylinder can also be provided. Since the invention can be used for all piston types and piston materials, as well as for all piston ring shapes and piston ring materials, in the following only one piston type and only one design of a piston ring will be used to describe the present invention, as examples.

In this embodiment, the piston/piston ring arrangement 12 according to the invention has a piston 13 in the form of a two-part welded box piston. Piston 13 has an upper piston part 14 having a circumferential top land 15 and a circumferential ring belt 16, as well as a lower piston part 17 having pin bosses 18 set back with regard to the ring belt 16, with pin bores 19 for accommodating a piston pin (not shown). Ring belt 16 is composed of three ring grooves 21a, 21b, 21c, in which piston rings 22a, 22b, 22c are accommodated. In the assembled state, piston 13 is accommodated in cylinder sleeve 11 of an internal combustion engine. Working surfaces 23 of cylinder sleeve 11 and the mantle surfaces of piston rings 22a, 22b, 22c stand in tribological contact with one another during engine operation, in known manner.

Figure 2:
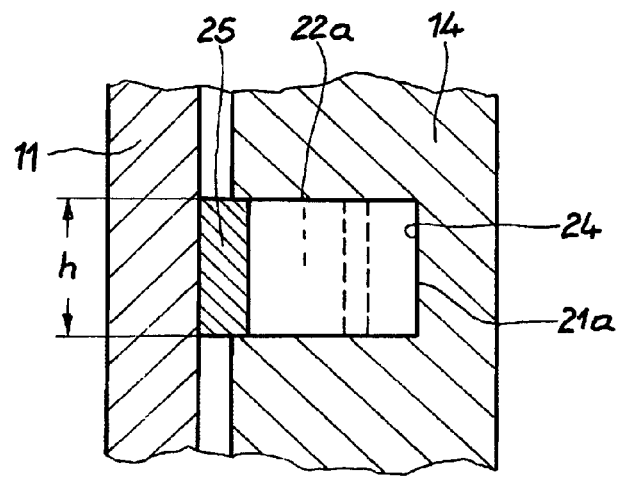
FIG. 2 shows an enlarged partial representation of the piston/piston ring arrangement according to the invention, from FIG. 1.

FIG. 2, in an enlarged partial representation, shows the piston/piston ring arrangement 12 according to the invention for modular unit 10 according to the invention, using the example of piston ring 22a, in other words the first compression ring. Piston ring 22a is accommodated in ring groove 21a and a spring element 25 is disposed between groove root 24 of ring groove 21a and piston ring 22a. Spring element 25 and piston ring 22a have the same axial height h in the exemplary embodiment. Spring element 25 stands in tribological contact with working surface 23 of cylinder sleeve 11.

FIGS. 3 to 5 show the structure of the piston/piston ring arrangement 12 according to the invention in detail, for modular unit 10 according to the invention according to FIG. 1. Piston ring 22a has a ring gap 26. In this embodiment, the free ends of piston ring 22a that delimit ring gap 26 are configured as slanted surfaces 27. In this embodiment, spring element 25 is configured as a leaf spring made of steel, and is disposed in ring groove 21a in a circumference region of 270°. Spring element 25 has an elevation 28 that fills ring gap 26 of the piston ring 22a. Outer surface 29 of elevation 28 and mantle surface 31 of piston ring 22a are disposed flush with one another, so that in the assembled state of modular unit 10, outer surface 29 of elevation 28 lies closely against working surface 23 of cylinder sleeve 11 and stands in tribological contact with working surface 23. For this purpose, working surface 23 of cylinder sleeve 11 and outer surface 29 of elevation 28 have the same curvature. In this embodiment, elevation 28 is formed by converging slants 33 that are connected with a crosspiece 32. Slants 33 of elevation 28 of spring element 25 and slanted surfaces 27 of piston ring 22a correspond with one another, in such a manner that piston ring 22a and spring element 25 lie fully against one another.

The present invention brings about the result that on the basis of the bias of spring element 25, mantle surface 31 of the piston ring 22a lies reliably tightly against the working surface 23 of cylinder sleeve 11 during engine operation. The present invention therefore makes it possible, in particularly simple manner, to achieve a very good seal of the cylinder space with regard to the combustion chamber.

Accordingly, while only a few embodiments of the present invention have been shown and described, it is obvious that many changes and modifications may be made thereunto without departing from the spirit and scope of the invention.

What is claimed is:

1. A piston/piston ring arrangement for an internal combustion engine, comprising:
   a piston;
   at least one ring groove accommodating exactly one piston ring having a ring gap; and
   a spring element disposed between a groove root of the ring groove and the piston ring, said spring element forming an elevation that fills the ring gap of the piston ring;
   wherein an outer surface of the elevation and a mantle surface of the piston ring are disposed flush with one another,
   wherein the elevation has converging slants connected with a crosspiece, and
   wherein the piston ring has slanted surfaces corresponding to the slants.

2. The piston/piston ring arrangement according to claim 1, wherein the spring element is disposed in the ring groove in a circumference region of at least 180°.

3. The piston/piston ring arrangement according to claim 1, wherein the spring element and the piston ring have a same axial height.

4. The piston/piston ring arrangement according to claim 1, wherein the spring element is configured as a leaf spring.

5. A modular unit comprising:
   a piston/piston ring arrangement comprising:
      a piston;
      at least one ring groove accommodating exactly one piston ring having a ring gap; and
      a spring element disposed between a groove root of the ring groove and the piston ring, said spring element forming an elevation that fills the ring gap of the piston ring; and
   a cylinder or a cylinder sleeve of an internal combustion engine, wherein a mantle surface of the piston ring lies closely against a working surface of the cylinder or the cylinder sleeve, and wherein the outer surface of the elevation and a mantle surface of the piston ring are disposed flush with one other, so that the outer surface of the elevation lies against the working surface of the cylinder or the cylinder sleeve,
   wherein the elevation has converging slants connected with a crosspiece, and the piston ring has slanted surfaces corresponding to the slants.

6. The modular unit according to claim 5, wherein the spring element is disposed in the ring groove in a circumference region of at least 180°.

7. The modular unit according to claim 5, wherein the spring element and the piston ring have a same axial height.

8. The modular unit according to claim 5, wherein the spring element is configured as a leaf spring.

* * * * *